(12) United States Patent
Douglis et al.

(10) Patent No.: US 8,943,193 B2
(45) Date of Patent: Jan. 27, 2015

(54) UNIFIED WEB HOSTING AND CONTENT DISTRIBUTION SYSTEM AND METHOD FOR ASSURING PREDETERMINED PERFORMANCE LEVELS

(75) Inventors: Frederick Douglis, Basking Ridge, NJ (US); David H. Shur, Holmdel, NJ (US); Joseph M. Sommer, Rutherford, NJ (US); Jacobus E. Van Der Merwe, New Providence, NJ (US)

(73) Assignee: Marlow Technologies, LLC., Wilmington, DE (US)

( * ) Notice: Subject to any disclaimer, the term of this patent is extended or adjusted under 35 U.S.C. 154(b) by 165 days.

(21) Appl. No.: 13/439,057

(22) Filed: Apr. 4, 2012

(65) Prior Publication Data

US 2012/0246306 A1 Sep. 27, 2012

Related U.S. Application Data

(63) Continuation of application No. 12/540,137, filed on Aug. 12, 2009, now Pat. No. 8,176,172, which is a continuation of application No. 10/743,430, filed on Dec. 23, 2003, now Pat. No. 7,657,622.

(51) Int. Cl.
*G06F 15/173* (2006.01)
*H04L 12/24* (2006.01)
*H04L 12/26* (2006.01)

(52) U.S. Cl.
CPC ........ *H04L 41/5003* (2013.01); *H04L 41/5083* (2013.01); *H04L 41/5009* (2013.01); *H04L 43/16* (2013.01)
USPC ........................................................ 709/224

(58) Field of Classification Search
USPC ......................................................... 709/224
See application file for complete search history.

(56) References Cited

U.S. PATENT DOCUMENTS

| 6,108,703 | A | 8/2000 | Leighton et al. |
| 6,701,342 | B1 | 3/2004 | Bartz et al. |
| 6,728,748 | B1* | 4/2004 | Mangipudi et al. ........... 718/105 |
| 6,976,090 | B2 | 12/2005 | Ben-Shaul et al. |
| 7,007,089 | B2 | 2/2006 | Freedman |
| 7,099,936 | B2 | 8/2006 | Chase et al. |
| 7,103,645 | B2 | 9/2006 | Leighton et al. |
| 7,111,061 | B2* | 9/2006 | Leighton et al. ............. 709/224 |
| 7,136,922 | B2* | 11/2006 | Sundaram et al. ............ 709/224 |
| 7,185,052 | B2 | 2/2007 | Day |
| 7,225,254 | B1 | 5/2007 | Swildens et al. |
| 7,289,519 | B1* | 10/2007 | Liskov .......................... 370/400 |
| 7,337,214 | B2* | 2/2008 | Douglass et al. ............. 709/214 |
| 7,379,428 | B2* | 5/2008 | Xu et al. ....................... 370/254 |

(Continued)

*Primary Examiner* — Alicia Baturay
(74) *Attorney, Agent, or Firm* — Volpe and Koenig, P.C.

(57) ABSTRACT

A service model, integrated system, and method for enabling a service provider to deliver an integrated web hosting and content distribution service offering, which affords assured operational performance service levels, regardless of whether the customer's web site is served by the service provider's hosting center, the service provider's content distribution network (CDN), by a third party web host, or by a third party CDN. A monitoring system of the primary service provider receives detailed capacity and health statistics from any CDN under the operational control of the primary service provider, receives aggregate capacity and health statistics from other CDNs not under the operational control of the primary service provider. A redirection system then decides to which web host, content distribution network, or combination thereof, user requests for content are directed in order that operational performance service levels are maintained.

13 Claims, 8 Drawing Sheets

(56) References Cited

U.S. PATENT DOCUMENTS

| | | | |
|---|---|---|---|
| 7,562,153 B2 * | 7/2009 | Biliris et al. | 709/238 |
| 7,584,261 B1 * | 9/2009 | Teodosiu et al. | 709/217 |
| 7,596,784 B2 * | 9/2009 | Abrams et al. | 717/172 |
| 7,653,689 B1 * | 1/2010 | Champagne et al. | 709/206 |
| 7,653,700 B1 | 1/2010 | Bahl et al. | |
| 7,836,295 B2 * | 11/2010 | Chari et al. | 713/154 |
| 8,135,828 B2 * | 3/2012 | Agarwal et al. | 709/224 |
| 8,364,951 B2 * | 1/2013 | Peterka et al. | 713/155 |
| 8,429,221 B2 * | 4/2013 | Barbir et al. | 709/203 |
| 8,520,850 B2 * | 8/2013 | Helms et al. | 380/239 |
| 8,578,441 B2 * | 11/2013 | Giles et al. | 726/1 |
| 8,584,259 B2 * | 11/2013 | Le Chevalier et al. | 726/28 |
| 8,621,540 B2 * | 12/2013 | Apsangi et al. | 725/116 |
| 2001/0052016 A1 | 12/2001 | Skene et al. | |
| 2002/0184403 A1 * | 12/2002 | Dahlin et al. | 709/316 |
| 2003/0079027 A1 * | 4/2003 | Slocombe et al. | 709/229 |
| 2003/0115283 A1 | 6/2003 | Barbir et al. | |
| 2004/0128499 A1 * | 7/2004 | Peterka et al. | 713/155 |
| 2006/0021001 A1 * | 1/2006 | Giles et al. | 726/1 |
| 2009/0161554 A1 * | 6/2009 | Agarwal et al. | 370/241 |
| 2010/0070603 A1 * | 3/2010 | Moss et al. | 709/207 |
| 2011/0078230 A1 * | 3/2011 | Sepulveda | 709/203 |
| 2013/0173769 A1 * | 7/2013 | Seastrom et al. | 709/223 |
| 2013/0174272 A1 * | 7/2013 | Chevalier et al. | 726/28 |
| 2013/0195204 A1 * | 8/2013 | Reznik et al. | 375/240.26 |

* cited by examiner

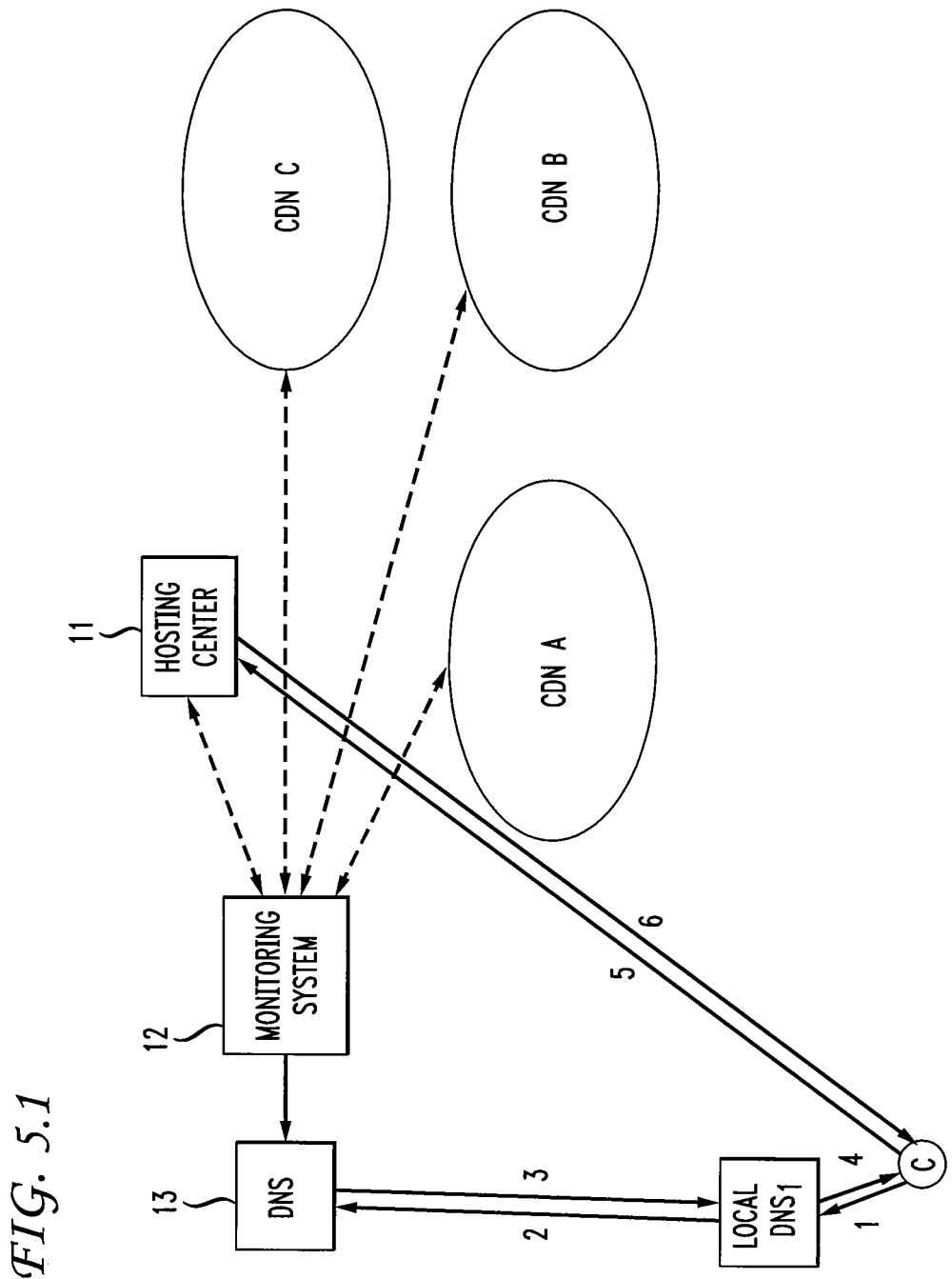
FIG. 5.1

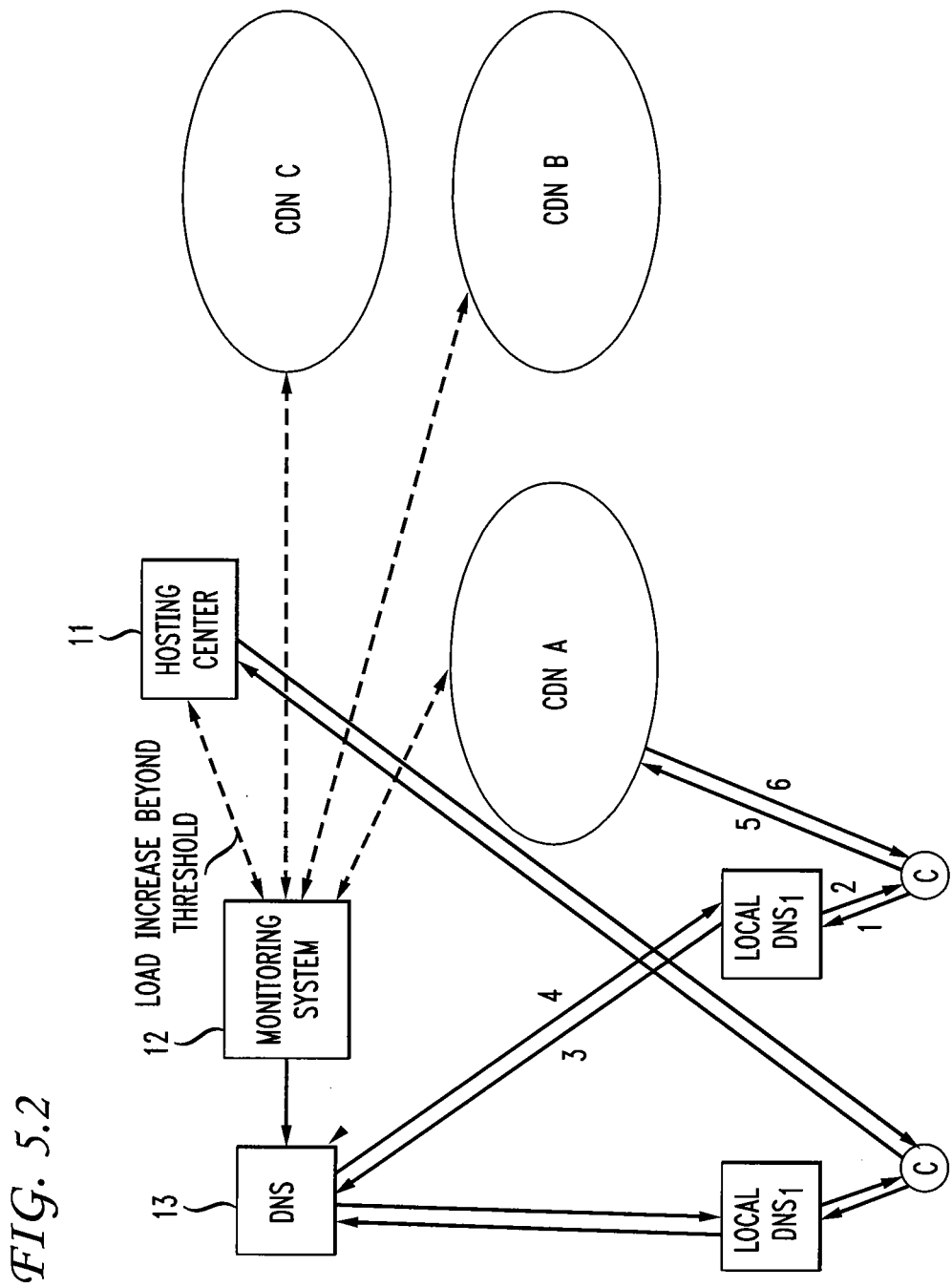
FIG. 5.2

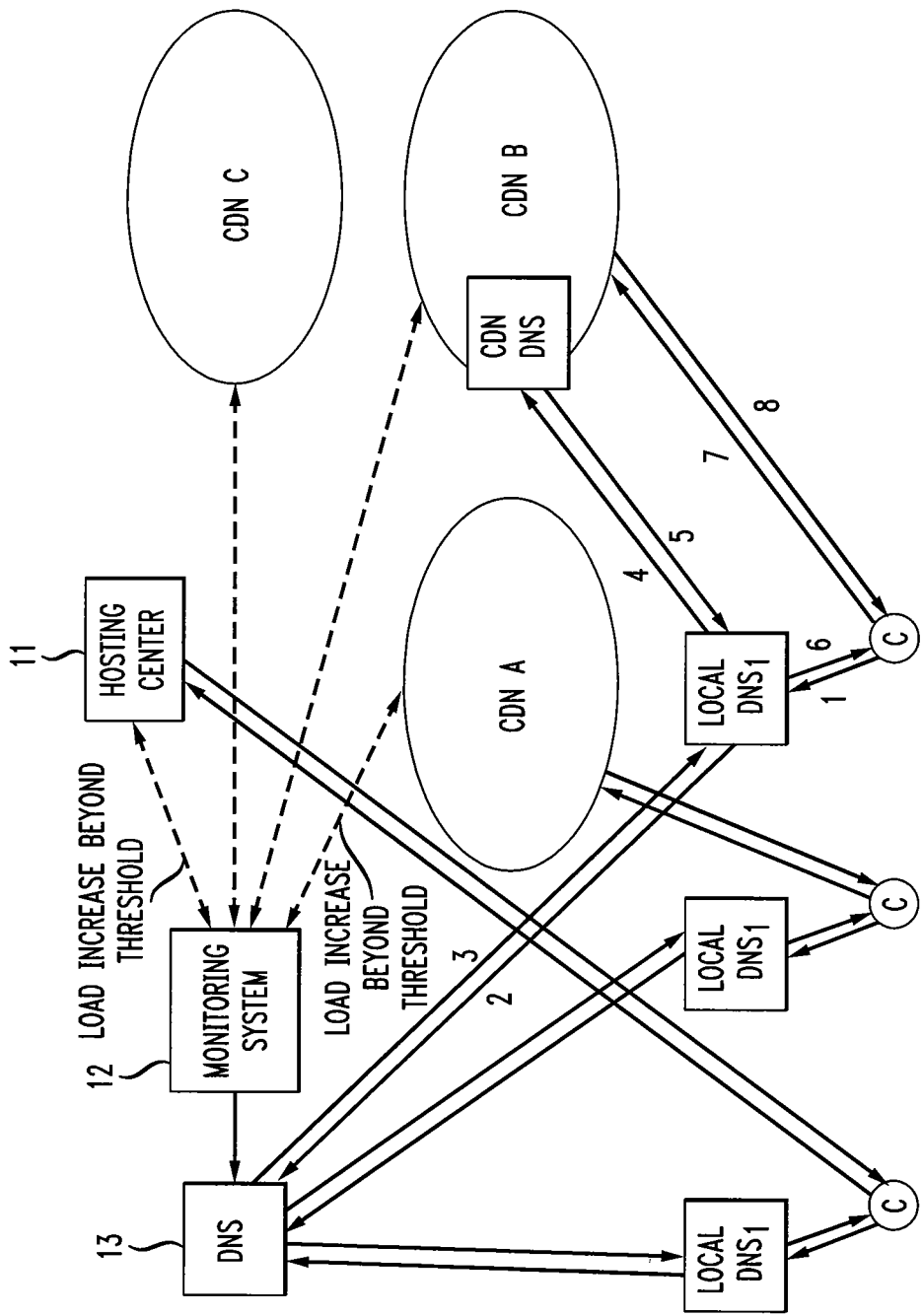
FIG. 5.3

UNIFIED WEB HOSTING AND CONTENT DISTRIBUTION SYSTEM AND METHOD FOR ASSURING PREDETERMINED PERFORMANCE LEVELS

This application is a continuation of prior application Ser. No. 12/540,137 filed Aug. 12, 2009, which is a continuation of prior application Ser. No. 10/743,430 filed Dec. 23, 2003 which issued on Feb. 2, 2010 as U.S. Pat. No. 7,657,622, both of which are incorporated by reference herein in their entirety.

BACKGROUND OF THE INVENTION

1. Field of the Invention

A service model, integrated system, and method enabling a service provider to deliver an integrated web hosting and content distribution service offering, which provides assured service levels, regardless of whether the customer's web site is served by the service provider's hosting center, the service provider's content distribution network (CDN), or by a third party CDN.

2. Description of Background Art

Traditionally, content distribution network operators serve all-or-nothing for an area of a customer enterprise's web site; i.e., the enterprise operates its own web site for serving the content, or the enterprise outsources a name space (hostname) to a CDN operator to manage. There are currently some hybrid approaches offered by service providers. These include offering an enterprise needing web hosting a special price to include content distribution automatically as a part of a package, or offering the enterprise the ability to turn on a CDN as an "insurance policy" to back up an overloaded server. For an enterprise or organization with unpredictable loads, this can lead to unpredictability in cost and performance.

In current common business models, web hosting and content distribution networks (CDNs) are distinct. A web hosting service provider runs an "origin server" that is the ultimate site where requests for web content from client machines are handled. As shown in FIG. 1, the web hosting service provider may itself have a cluster of servers front-ended by a content-aware switch Sw, and serves requests from client machines, without any inherent content distribution network.

FIG. 2 shows a DNS-based CDN, and illustrates client machines C, local domain name server $DNS_1$, caches 2, as part of the EP network. The CDN can cache web content closer to the client machines C of the end users of its customers, thus improving performance and scaling to a larger number of customers. CDNs usually charge a premium for this service, partly due to the added cost of the infrastructure (additional caches 2), and primarily because enterprises are willing to pay a premium for more predictable operational performance.

There are two common models for using a CDN. Some content distribution providers require customers to add special coding to their HTML pages, to rewrite embedded links to retrieve objects exclusively from caches under its own operational control and ownership. On the other hand, other CDNs, including AT&T's CDN, for example, outsource a domain (for example images.company.com), to the CDN, making the CDN "authoritative" for where that content is served. The CDN resolves that hostname to an IP address for a cache (or cluster of caches) it serves.

An extension of the CDN model is something called "Content Internetworking", a.k.a. "Content Distribution Internetworking" (CDI), as in FIG. 3. With CDI, a CDN can have another entity, such as a second CDN B, or third CDN C, resolve the name to an IP address in its own service. In this example, (1) a user using a client machine C goes to a customer local DNS server $DNS_1$, which (2) sends a message to a CDI DNS server. That CDI DNS server returns a response (3) to the customer's local DNS server $DNS_1$, which may cause it to make a subsequent DNS request (3') of a DNS server at a second CDN (B in this case) getting a response (3"). The customer's local $DNS_1$ (4) returns an IP address to the client machine C, which retrieves the data from either CDN B (5, 6) or CDN A (5', 6').

SUMMARY AND OBJECTS OF THE PRESENT INVENTION

The object of the present invention is to unify hosting and CDNs with respect to cost, performance, reliability, and other metrics commonly used to evaluate a hosting service or CDN.

To achieve the above object, according to a first aspect of the present invention, a system is provided for delivering an integrated web hosting and content distribution affording predetermined service performance levels. The system includes a first web hosting server for a web site; at least one content distribution network; a redirection means, the redirection means for receiving DNS requests from access devices through a local DNS; and monitoring means for monitoring operational performance parameters of the first web host and the at least one content distribution network, the redirection means and the monitoring means being under the operation control of a primary service provider. Based on signals from the monitoring means, the redirection means of the primary service provider returns a record to the local DNS indicating whether or not the first web hosting server is capable of meeting a predetermined operational performance threshold. The redirection means sends the local DNS a record including an IP address of the first web hosting server when a performance value is below a predetermined operational performance threshold, whereas the redirection means sends the local DNS a different record causing the local DNS to make a subsequent DNS request to a DNS of the at least one content distribution network when the performance value is equal to or above the predetermined operational performance threshold.

According to a second aspect of the present invention, the first web hosting server and one of the at least one content distribution networks are operated under the control of the primary service provider.

According to a third aspect of the present invention the first web hosting server and the at least one content distribution networks are monitored by, but not operated by, the primary service provider.

According to a fourth aspect of the present invention, the monitoring means of the primary service provider receives detailed capacity and health statistics of any of the at least one CDN under the operational control of the primary service provider, and receives aggregate capacity and health statistics from others of the at least one CDN not under the operational control of the primary service provider.

According to a fifth aspect of the present invention, a method is provided for delivering an integrated web hosting and content distribution service which affords predetermined operational performance levels. The method includes the steps of providing a first web hosting server for a web site, at least one content distribution network, redirection means, and monitoring means, wherein the redirection means and the monitoring means are under operation control of a primary service provider; receiving a DNS requests from access devices through a local DNS; and monitoring operational performance parameters of a first web host and at least one content distribution network. Then, based on signals from the monitoring means, the redirection means of the primary service provider returns a record to the local DNS indicating whether or not the first web hosting server is capable of meeting a predetermined operational performance threshold. The record sent by the redirection means includes an IP address of the first web hosting server when a performance value is below a predetermined operational performance threshold, whereas the redirection means sends the local DNS a different record causing the local DNS to make a subsequent DNS request to a DNS of the at least one content distribution network when the performance value is equal to or above the predetermined operational performance threshold.

As a result of the present invention, organizations and enterprises are provided an integrated web hosting and content distribution service offering, which provides assured service levels, regardless of whether the customer's web site is served by the service provider's hosting center, the service provider's content distribution network (CDN), or by a third party CDN.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5.1-5.3 show the message exchanges during operation of the present invention under three different representative load conditions.

DETAILED DESCRIPTION OF THE PREFERRED EMBODIMENTS

Figure 1:
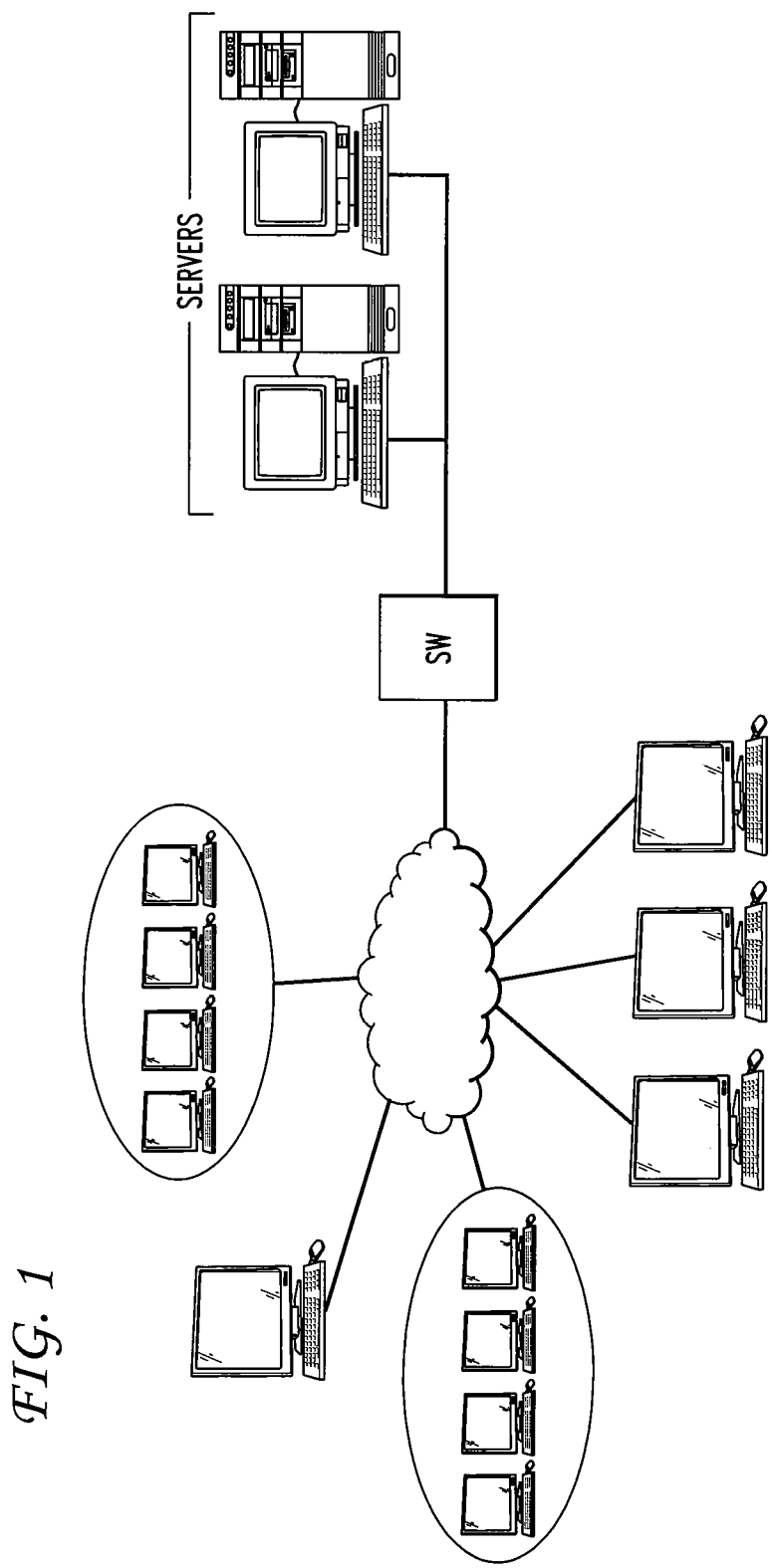
FIG. 1 illustrates a conventional Web Hosting with a server cluster.
Figure 2:
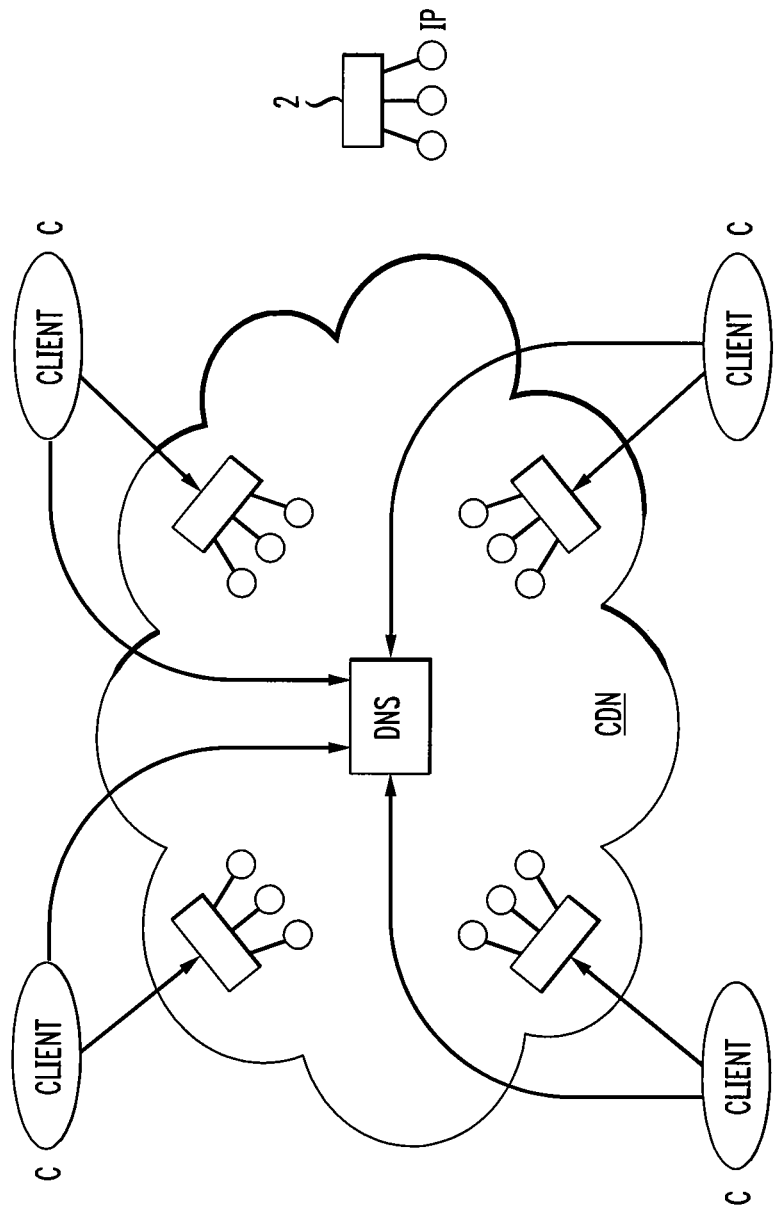
FIG. 2 illustrates a DNS based Content Distribution Network (CDN)
Figure 3:
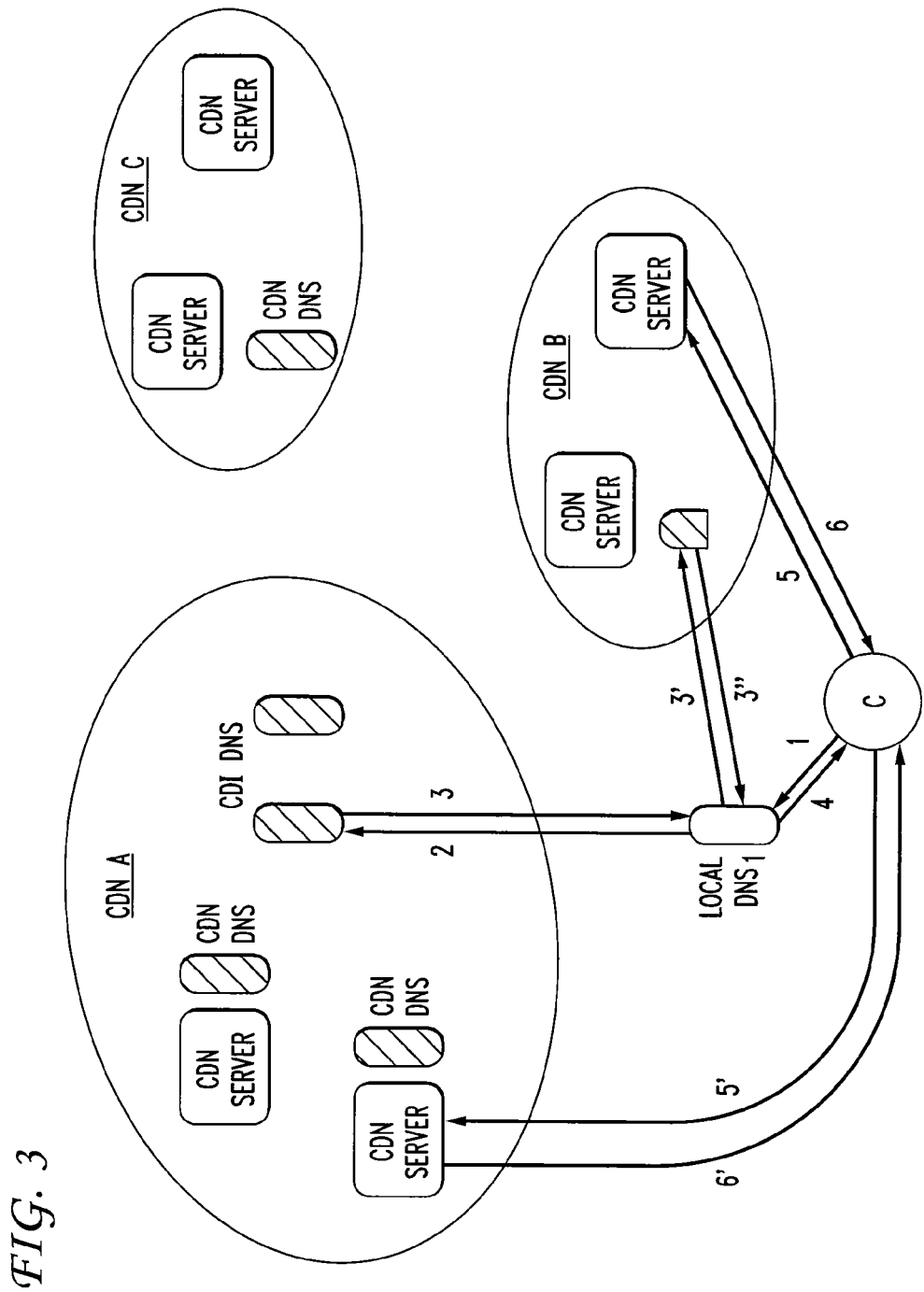
FIG. 3 illustrates Content Internetworking (CDI) with DNS.
Figure 4:
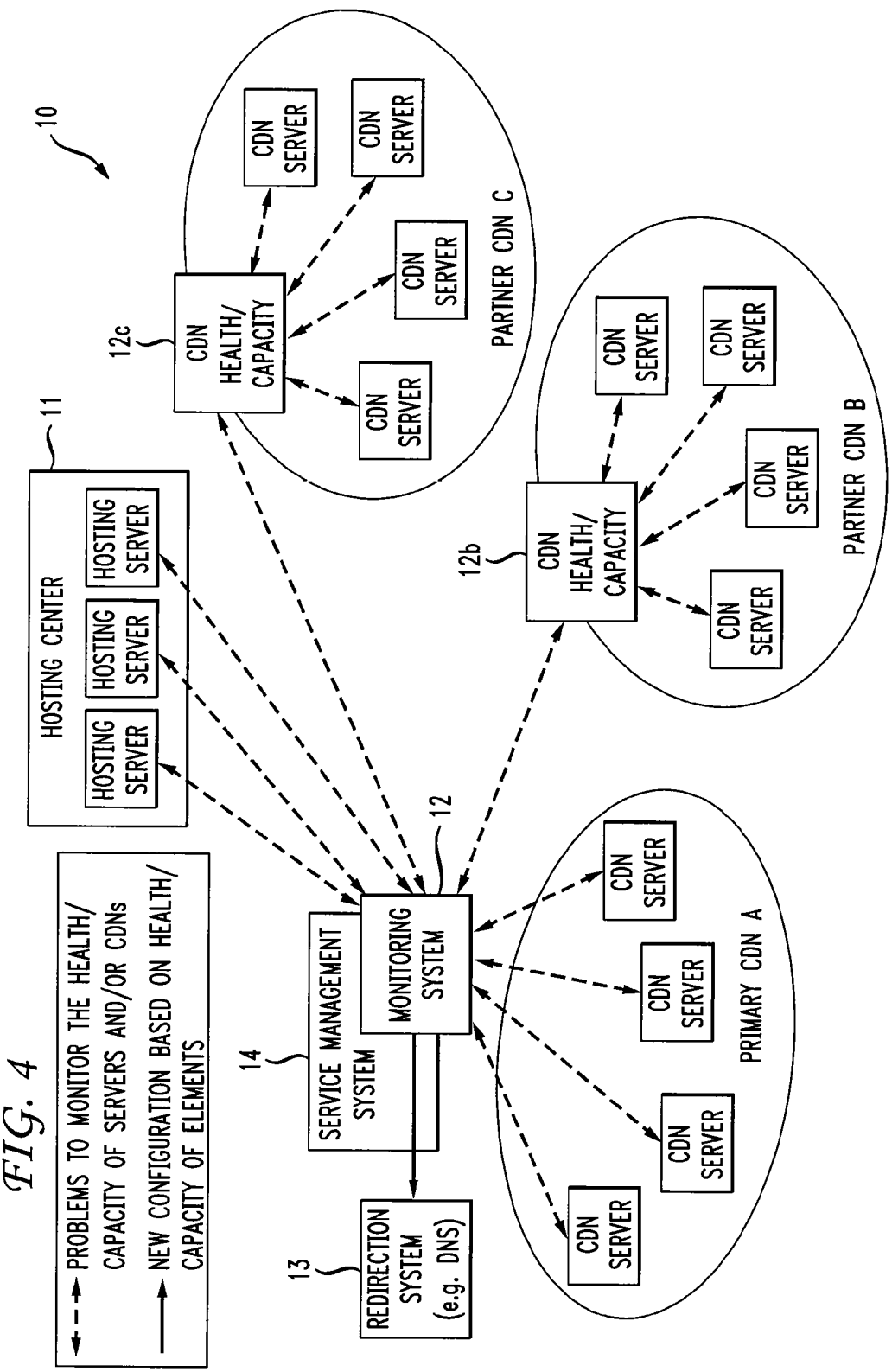
FIG. 4 is a schematic overview of the architecture of the present invention.

FIG. 4 is a schematic diagram of the different components of the integrated web hosting and content delivery system 10 of the present invention, as deployed in a representative environment with a primary CDN (CDN A) and two partner CDNs (CDN B, and CDN C). Shown are a hosting center 11, several content distribution networks (CDN A, CDN B, and CDN C), a monitoring system 12, a redirection system 13, and a service management system 14. Note that the redirection system 13, the monitoring system 12, the service management system 14, and typically at least one CDN (CDN A is this case) are assumed to be under the same operational control as the primary service provider. The content distribution networks of the present invention may any of a variety of content distribution networks, which provide audio streaming, video streaming, website access, or any other web-based service.

With this arrangement, the monitoring system 12 of the primary service provider can directly monitor the capacity and health of servers in its own CDN A, as shown by the broken lines leading from the monitoring system 12 to CDN A. However, it is typically not possible for the primary service provider's monitoring system to fully monitor the partner CDNs (CDN B and CDN C). Instead, as shown, the monitoring system 12 will interact with a "local" monitoring system 12$b$, 12$c$ of the partner CDN B, CDN C. CDN B and CDN C monitor the performance of their own servers and other systems internally, and then relay aggregate capacity and health statistics to the primary service provider monitoring system 12, as shown by the broken lines leading from monitoring system 12 to the monitoring system 12$b$ of CDN B, and to the monitoring system 12$c$ of CDN C. The monitoring system 12 in the primary service provider network uses the health and capacity measurements of its own CDN A and partner CDN B and CDN C to determine which customer requests should be served from the either the hosting center 11, or one or more of the CDN servers of the partner CDNs involved. The monitoring system 12 then updates the redirection system 13 which redirects the actual user requests to the appropriate server(s). The redirection system 13 can perform the client redirection using several well known methods, e.g.: DNS, or application level redirection. (Known Content Network (CN) Request-Routing Mechanisms; A. Barbir, B. Cain, R. Nair and O. Spatscheck, IETF Request for Comments: 3568, July 2003).

Next, examples of the operation of the present invention will be discussed. In particular, FIGS. 5.1, 5.2 and 5.3 show the message exchanges involving an instantiation of the described invention under varying load conditions.

In FIG. 5.1, the available capacity in the hosting center 11 is such that all client requests can be served from there. The interaction with a typical client is shown, including:

1: The customer's client machine C requests its local DNS server $DNS_1$ to resolve a fully qualified domain name (FQDN) that is associated with the service, e.g.: customer1.onerateservice.com. (Note that this FQDN might be part of a URL that the user encounters while browsing the web.)

2: The local DNS server $DNS_1$ determines that the authoritative DNS server for this domain is the DNS server(s) operated by the primary service provider. (Note that it can determine this in the normal way by querying the root DNS servers. This step is not shown.)

3: The redirection system can return an A-record containing the IP address of the server in the hosting center 11 which should be serving the request.

4: The local DNS server $DNS_1$ returns the A record to the client machine C.

5/6: The client machine C directly interacts with the server in the hosting center 11 to retrieve the data.

FIG. 5.2 shows the scenario where the load in the hosting center increase to the point where a customer-specific operational performance threshold is triggered in the monitoring system 12, causing some or all of the user requests to be directed to CDN A, in order that the requested content can be served in accordance with a predetermined service level (as set by a service level agreement (SLA) between the primary CDN and the customer enterprise). Note that as shown in FIG. 5.2, the content can be served from both the hosting center 11 and CDN A at the same time. Thus, some client machine requests will still be directed to the hosting center 11 as described before, while others will be directed to CDN A.

1: The client machine C requests its local DNS server $DNS_1$ to resolve a full qualified domain name (FQDN) that is associated with the service, e.g.: customer1.onerateservice.com. (Note that this FQDN might be part of a URL that the user encounters while browsing the web.)

2: The local DNS server $DNS_1$ determines that the authoritative DNS server (redirection system) for this domain is the DNS server(s) operated by the primary service provider. (Note that it can determine this in the normal way by querying the root DNS servers. This step is not shown.)

3: The redirection system 13 can return an A-record containing the IP address of the server, either in the hosting center 11 or in CDN A, which should be serving the request.

4: The local DNS server $DNS_1$ returns the A record to the client machine C.

5/6: The client machine C directly interacts with the appropriate server, either in the hosting center 11 or CDN A to retrieve the data.

FIG. 5.3 shows the situation when the load in the hosting center and CDN A is such that the monitoring system decides to also include CDN B in the service of the requested content. Further, the content can be served from each of the hosting center 11, CDN A, and CDN B simultaneously, with the monitoring system 12 determining the amount of requests going to each. In this case it is assumed that CDN B is a partner CDN so that the primary service provider redirection system or DNS can not directly resolve the DNS request into an A-record. Instead, the local DNS server $DNS_1$ is directed to a DNS server in the partner CDN B, which will resolve the request to an A-record. (Note that this procedure could also have been required for the previous case if CDN A, had it own DNS system or redirection system, e.g. to realize local load balancing.)

Message exchanges shown in FIG. 5.3 include:

1: The client machine C requests its local DNS server $DNS_1$ to resolve a full qualified domain name (FQDN) that is associated with the service, e.g.: customer1.onerateservice.com. (Note that this FQDN might be part of a URL that the user encounters while browsing the web).

2: The local DNS server $DNS_1$ determines that the authoritative DNS server for this domain is the DNS server(s) operated by the primary service provider. (Note that it can determine this in the normal way by querying the root DNS servers. This step is not shown.)

3: The redirection system 13 can return an NS-record or a CNAME-record which points the local DNS server $DNS_1$ to a DNS server in the partner CDN B.

4: The local DNS server $DNS_1$ requests a resolution from partner CDN B's DNS server.

5: Partner CDN B's DNS server can return an A-record containing the IP address of the server in CDN B which should be serving the request.

6: The local DNS server $DNS_1$ returns the A-record to the client machine C.

7/8: The client machine C directly interacts with a server in the hosting center 11, in CDN A, or in CDN B, to retrieve the data.

Internet access for the client machines C described above and shown in FIGS. 5.1 to 5.3 may be via a dial-up modem, DSL-modem or cable modem, in the case of typical residential users, or via a LAN with connectivity to the service provider through a router, in the case of typical business users. In all cases, a client machine would make use of a local DNS server to resolve host names to IP addresses to enable the client to access servers in the network.

The integrated web hosting and content distribution system of the present invention includes a billing model that permits the hosting/CDN service to track usage both internally, and externally (when using CDI). It also includes integrated provisioning, measurement, and management systems. The integrated provisioning system accepts input from/about the customer, and interfaces with the provisioning system of each of the hosting service and the CDN. Similarly an integrated billing/measurement system interfaces to the corresponding systems in both the primary service provider, the hosting service, and any partner CDNs. Offered load to the integrated system is tracked in real-time or near-time time, in order to drive content routing decisions. The functions are part of the service management system 14 shown in FIG. 14. On the other hand, they may be separate systems and functions.

The monitoring system has a technical architecture that permits the system to select dynamically among the hosting service, and multiple CDNs. This is accomplished as shown in FIGS. 5.1-5.3. The DNS server to which the local DNS is referred has information about the load and availability of the web-hosting complex, the integrated CDN, and partner CDNs (as specified by CDI). It also has information about performance/load capacity thresholds that trigger a switch from one mode of operation to another. Such thresholds may be customer specific (in other words, DNS name specific).

The architecture of the present invention extends the architecture of current service offerings, for example the AT&T CDN Brokering Service, by integrating a web-hosting complex into the brokering CDN's distribution options, and by unifying the billing of a web hosting service and one or more CDNs.

Next a summary of some of the effects and advantages of the present invention are described.

A primary benefit is simplified service from the point of view of the enterprise customer. For example, no longer does an enterprise have to decide whether to make use of its own hosting center, or whether their traffic volumes warrant the use of a CDN. The enterprise can simply sign up with a service provider offering the integrated web hosting and content distribution service of the present invention. Then, when their traffic volumes grow to the point where a CDN is needed, the services of the CDN are made available automatically in real-time, without the need for further actions by the enterprise. As a result, operational performance levels will be maintained at levels agreed to between the primary service provider and the enterprise.

Another major simplification from the customer point of view is in terms of billing and interaction with the primary service provider. A single bill with a flat rate billing scheme will be provided to the customer. This flat rate may be a flat rate per transaction, or a flat rate for usage over a period of time, or a combination of these. In other words, there will be no premium charges for maintaining a certain operational performance level, which the enterprise might otherwise be subject to, without the present invention.

Figure 6:
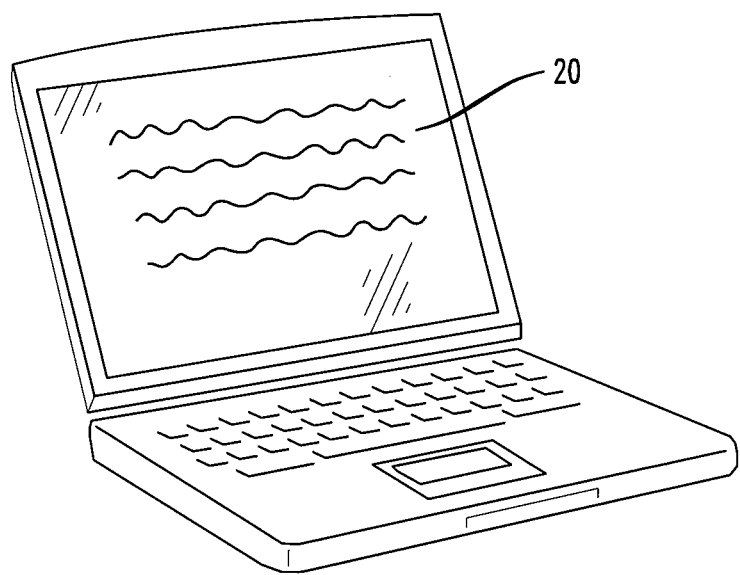
FIG. 6 shows a representative screen of a customer portal allowing direct customer visibility into and management of the operational performance and other aspects of the service of the present invention.

In addition, the present invention will enable the primary service provider to provide a single point of contact (SPOC) to each customer for all the customer's web hosting, content distribution, and billing and reporting needs. As shown in FIG. 6, the present invention also offers a web portal or customer management interface 20 allowing customers direct access to functions such as response time, available bandwidth, billing, trouble status, and the like.

Many variations of the service concept described above can be made and are to be considered within the scope of the present invention.

For example, the content distribution networks of the present invention may any of a variety of content distribution networks, which provide audio streaming, video streaming, website access, or any other web-based service, regardless of whether are under the control of the primary service provider or not.

Further, many variations are possible regarding the mechanisms used to perform redirection. For example, the present invention is described as making use of a DNS-based system to perform the redirection task. However, many other redirection methods can be used to achieve the service unification, including application based redirection.

Further, while the present invention assumes that the redirection system and monitoring system to be under the operational control of the primary service provider, having direct operational control of at least one CDN and the web hosting center are not absolute requirements. All CDNs may be provided by other (partner) service providers. Likewise, the web hosting center, may be customer operated, or operated by another organization, or any combination of these.

In addition, many variations are possible regarding access to and control of the local domain name servers $DNS_1$ (See FIGS. 5.1-5.3). For example, residential users may gain access to a local $DNS_1$ controlled by their local cable service provider, or a local $DNS_1$ operated by their local phone company via a dial-up, or broadband link. Business organizations may operate their own domain name server $DNS_1$, or alternatively, the domain name server $DNS_1$ may be provided by the primary service provider, or other internet service provider (ISP).

Other service options are also available and should be considered to be within the scope of the present invention, including but not limited to, collocation services, managed web hosting services, load capacity testing services, customer performance monitoring and reporting, and customer management for requesting changes and reporting troubles. In addition, customer monitoring, reporting, and management may be provided via a "web portal", a customer management device of any known type, or other means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method comprising:
   monitoring, by utilizing a processor of a server, operational performance parameters of a web host and a first content distribution network, the first content distribution network under operational control of a primary service provider;
   receiving aggregate capacity and health statistics of a second content distribution network from a monitoring system associated with the second content distribution network, the second content distribution network not under operational control of the primary service provider;
   determining whether customer requests should be served by the first content distribution network or the second content distribution network based on the monitoring, wherein the customer requests are determined to be served by the first content distribution network if a performance threshold specific to a customer associated with the customer requests has not been exceeded;
   transmitting, to a redirection system, an indication that customer requests should be served by the first content distribution network or the second content distribution network based on the determining;
   tracking usage of the primary service provider, the web host, the first content distribution network, and the second content distribution network by the customer to provide unified billing information to the customer; and
   presenting the unified billing information via a graphical user interface that displays a response time, an available bandwidth, and a trouble status to the customer.

2. The method of claim 1 wherein the determining comprises:
   determining whether the web host is capable of meeting a predetermined service operational performance level.

3. The method of claim 2 wherein the determining whether the web host is capable of meeting a predetermined service operational performance level is based on a load on the web host.

4. The method of claim 2 wherein the predetermined service operational performance level is agreed to between the primary service provider and an individual client.

5. The method of claim 1 further comprising: transmitting a record from the redirection system to a local DNS.

6. The method of claim 5 wherein the record is based on the indication.

7. The method of claim 5 wherein the record comprises an internet protocol address of the first content distribution network or the second content distribution network based on the determining whether customer requests should be served by the first content distribution network or the second content distribution network.

8. A system comprising:
   a monitoring system that comprises a processor that monitors operational performance parameters of a web host and a first content distribution network under operational control of a primary server provider,
   receives aggregate capacity and health statistics of a second content distribution network from a monitoring system associated with the second content distribution network, the second content distribution network not under operational control of the primary service provider,
   determines whether customer requests should be served by the first content distribution network or the second content distribution network, wherein the customer requests are determined to be served by the first content distribution network if a performance threshold specific to a customer associated with the customer requests has not been exceeded,
   tracks usage of the primary service provider, the web host, the first content distribution network, and the second content distribution network by the customer to provide unified billing information to the customer, and
   presents the unified billing information via a graphical user interface that displays a response time, an available bandwidth, and a trouble status to the customer; and
   a redirection system in communication with the monitoring system, wherein the redirection system receives an indication from the monitoring system and transmits a record to a local domain server, the indication indicating that customer requests should be served by the first content distribution network or the second content distribution network.

9. The system of claim 8 wherein the record is based on the indication.

10. The system of claim 9 wherein the record comprises an internet protocol address of the web host for each domain name server request received from the local domain name server when a performance value is below a threshold.

11. The system of claim 8 wherein the redirection system comprises a redirection domain name server.

12. The system of claim 8 wherein the redirection system is further configured to provide application level redirection.

13. The system of claim 8 wherein the indication is based on a predetermined operational service performance level that is agreed to between a primary service provider and an individual client.

\* \* \* \* \*

UNITED STATES PATENT AND TRADEMARK OFFICE
CERTIFICATE OF CORRECTION

PATENT NO. : 8,943,193 B2
APPLICATION NO. : 13/439057
DATED : January 27, 2015
INVENTOR(S) : Frederick Douglis et al.

It is certified that error appears in the above-identified patent and that said Letters Patent is hereby corrected as shown below:

IN THE DRAWINGS

At FIG. 5.2, delete reference number "2" and insert --4--.

At FIG. 5.2, delete reference number "3" and insert --2--.

At FIG. 5.2, delete reference number "4" and insert --3--.

IN THE SPECIFICATION

At column 1, line 45, after the word "server" delete "DNS1" and insert --DNS--.

At column 4, line 2, after the word "may" insert --be--.

At column 6, line 16, after the word "FIG." delete "14" and insert --4--.

At column 7, line 5, after the word "may" insert --be--.

IN THE CLAIMS

At claim 8, column 8, line 37, after the word "primary" delete "server" and insert --service--.

At claim 8, column 8, line 60, after the word "domain" insert --name--.

Signed and Sealed this
Fourth Day of August, 2015

Michelle K. Lee
*Director of the United States Patent and Trademark Office*